University States Patent (12) United States Patent
Seshadri (10) Patent No.: US 9,860,168 B1
(45) Date of Patent: Jan. 2, 2018

(54) NETWORK PACKET HEADER MODIFICATION FOR HARDWARE-BASED PACKET PROCESSING (71) Applicant: Amazon Technologies, Inc., Seattle, WA (US)

(72) Inventor: Kiran Kalkunte Seshadri, Cedar Park, TX (US)

(73) Assignee: Amazon Technologies, Inc., Reno, NV (US)

( * ) Notice: Subject to any disclaimer, the term of this patent is extended or adjusted under 35 U.S.C. 154(b) by 122 days.

(21) Appl. No.: 14/860,494

(22) Filed: Sep. 21, 2015

(51) Int. Cl.
*H04L 29/06* (2006.01)
*H04L 12/741* (2013.01)
*H04W 24/02* (2009.01)

(52) U.S. Cl.
CPC .............. *H04L 45/74* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 5,481,735 A | 1/1996 | Mortensen et al. | |
| 6,675,218 B1 | 1/2004 | Mahler et al. | |
| 6,731,644 B1 | 5/2004 | Epps et al. | |
| 6,944,168 B2 | 9/2005 | Paatela et al. | |
| 7,613,209 B1 | 11/2009 | Nguyen et al. | |
| 7,904,892 B2 * | 3/2011 | Babb, II | G06F 8/75 717/105 |
| 9,183,244 B2 | 11/2015 | Bullis et al. | |
| 9,203,552 B2 * | 12/2015 | Geirhofer | H04L 1/0026 |
| 2009/0092136 A1 | 4/2009 | Nazareth et al. | |
| 2014/0344326 A1 * | 11/2014 | Kamath | H04L 67/1008 709/203 |

* cited by examiner

*Primary Examiner* — Fan Ng
(74) *Attorney, Agent, or Firm* — Robert C. Kowert; Meyertons, Hood, Kivlin, Kowert & Goetzel, P.C.

(57) ABSTRACT

A packet processor may implement network packet modification. A network packet may be received at a packet processor. A packet header modification may be identified for the network packet. The packet processor may access a memory to traverse a dependency graph for the packet header modification to obtain an operation to apply the packet header modification and dependent operations to update fields in the packet header to be changed as a result of the packet header modification. The dependency graph may have been stored in the memory prior to receiving the network packet. The obtained operations may be performed according to the traversal of the dependency graph. The modified packet may then be transmitted.

20 Claims, 8 Drawing Sheets

| address | header type | bit field offset | bit field width | operation | operand | number of child nodes | bit of parent node | Description |
|---|---|---|---|---|---|---|---|---|
| 0x0 | L3.5 | 128 | 16 | 710 Insert | Routing field | 3 | 0x1 | Insert Routing Information to GRE header |
| 0x1 | L3.5 | 2 | 1 | 720 OR | 1 | 0 | NA | Set the R bit of GRE header to 1 |
| 0x2 | L3.5 | 64 | 32 | 730 ADD | 32 | 0 | NA | Add 32 to GRE payload length |
| 0x3 | L3 | 16 | 16 | 740 ADD | 32 | 1 | 0x4 | Add 32 to L3 IPv4 Total Length |
| 0x4 | L3 | 80 | 16 | 750 Checksum | NA | 0 | NA | Update IPv4 Checksum |

NETWORK PACKET HEADER MODIFICATION FOR HARDWARE-BASED PACKET PROCESSING

BACKGROUND

Network communications are indispensable to the functioning of modern society. Networking infrastructure that supports the transmission of network communications is constantly challenged to keep pace with the increasing demand to leverage network communications for faster service, better performance, greater reach, or any other benefit that networking provides. Network switches, routers, bricks and other networking devices may need to increase the speed and capacity with which network communications are processed. For example, network processing operations may be moved from software dependent or software controlled implementations to hardware-based solutions in order to increase the speed at which network processing operations are performed. However, hardware-based networking solutions can be costly to implement and quickly become obsolete in dynamic networking environments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units. . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement packet header modifications for hardware-based packet processing. Packet header modifications may insert, update, or remove data in different fields of a network packet as part of packet processing. Packet header modifications are performed to implement a variety of packet processing operations. Forwarding decisions, for instance, may involve changing source and destination MAC addresses in a packet header for a packet when forwarding the network packet. Inserting, or removing, a tunnel header for a tunneling protocol is another example scenario where packet header modifications may be performed.

Packet header modifications may be applied to packets of network traffic. Packets may be a discrete portion of the stream of data transmitted over various types of network connections, such as twisted pair connections, coaxial connections, or fiber optic connections formatted according to particular protocols. In at least some embodiments, network packets may be a unit of data according to layer 3, the network layer, of the open systems interconnection (OSI) model for communications. Layer 3 protocols may include protocols such as IP, internet control message protocol (ICMP), IP security (IPsec), routing information protocol (RIP), and many others. Note that different packet modifications, however, may be inserted to encapsulate data at differing levels of the OSI model, such as layer 2, layer 2.5, layer 3, and layer 4.

Packet processors and other devices that implement a packet processing pipeline may apply packet header modifications to network packets that are received at the networking device. Switches, for instance, may perform forwarding operations that modify packet headers for network packets when the network packets are received and processed at the switch. The effect of packet header modifications is not typically limited to a single change to the packet header. Other fields in the packet header which store values that are dependent upon the change to the packet header may also need to be changed as a result of the packet header modification. For example, a packet header modification may insert a new field into a packet header. Fields that describe the length of the packet header (or portion of the packet header including the new field) and/or fields that store an error detection value (e.g., a checksum value) for the packet header (or portion of the packet header including the new field) may need to be updated in order to account for the new field. Otherwise, the dependent fields may store erroneous data.

Identifying and applying the appropriate dependent updates to a packet header for a packet header modification is not without difficulty. Software-based application of packet header modifications is often performed in order to provide a more robust decision making process for applying packet modifications and dependent operations. However, software-based packet header modifications rely upon a greater number of operations, increasing the processing latency for network packets and negating speed optimizations provided by hardware-based packet processing, even if the remaining packet processing operations are performed by the packet processor. In various embodiments, packet header modification may be implemented so that a hardware-based packet processing solution, such as a packet processor, may be configured to perform packet header modifications without assistance from software-based packet header modification techniques.

Figure 1:
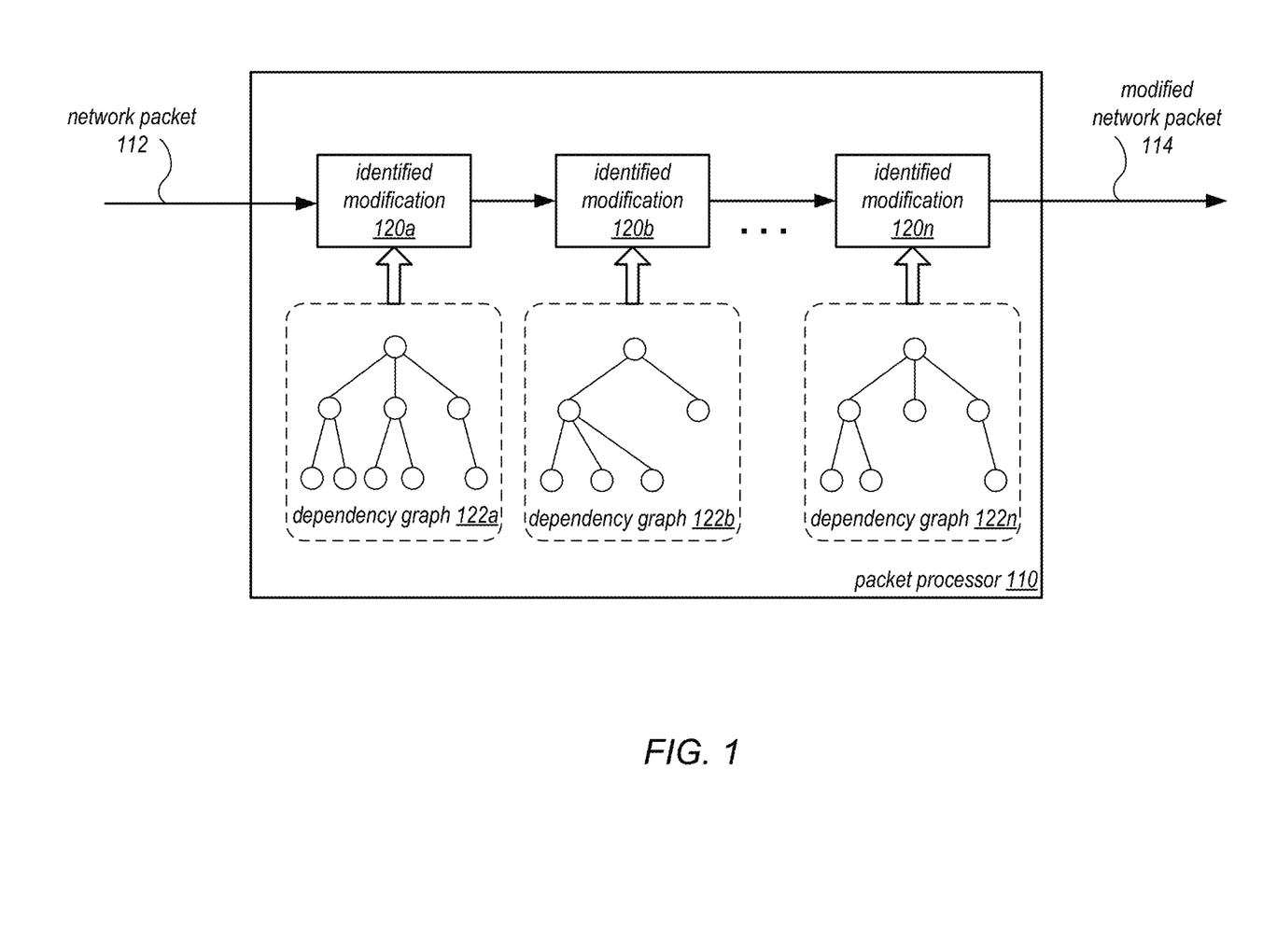
FIG. 1 illustrates a logical block diagram of packet header modification for hardware-based packet processing, according to some embodiments.

FIG. 1 illustrates a logical block diagram of packet header modification for hardware-based packet processing, according to some embodiments. Packet processor 110 may be specialized hardware, such as an application specific integrated circuit (ASIC) or other electronic circuitry (e.g., packet processor 250 in FIG. 2), which performs various packet processing operations including packet header modification. Packet processor 110 may be configured to receive a network packet 112, identify one or multiple packet header modifications 120, apply the identified packet header modifications 120 including dependent operations to update fields changed as a result of the identified modifications, and transmit the modified network packet 114.

To apply an identified modification 120 for network packet 112, packet processor 110 may be configured to access and traverse a corresponding dependency graph, as discussed in detail below with regard to FIGS. 4-7C. For example, dependency graph 122a may be stored in a memory implemented as part of packet processor 110 for identified modification 120a. In a least some embodiments, the memory may be a random access memory (RAM) component. An entry location (e.g., address, index, or other pointer) for dependency graph 122a may be determined for a root node of dependency graph 122a which may describe an operation to apply identified modification 120a to a packet header for network packet 112. Dependent operations to change fields in the packet header for network packet 112 may be obtained by traversing dependency graph 122a to reach the remaining nodes of dependency graph 122a. Locations of the different remaining nodes may be obtained from parent and/or adjacent nodes. In at least some embodiments, a depth first search technique may be utilized to traverse dependency graphs.

Figure 3:
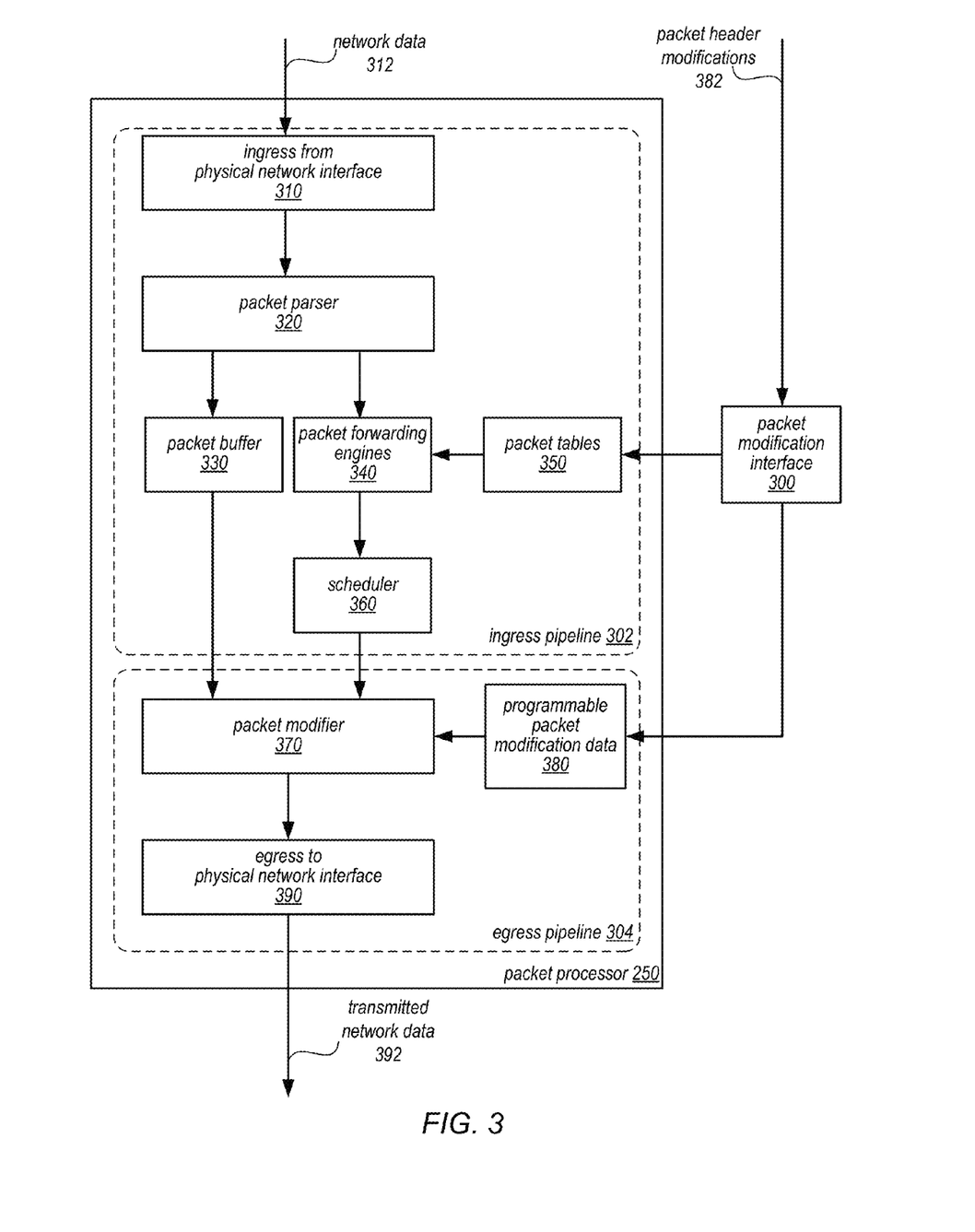
FIG. 3 is a logical block diagram illustrating a packet processor that performs packet header modification, according to some embodiments.
Figure 8:
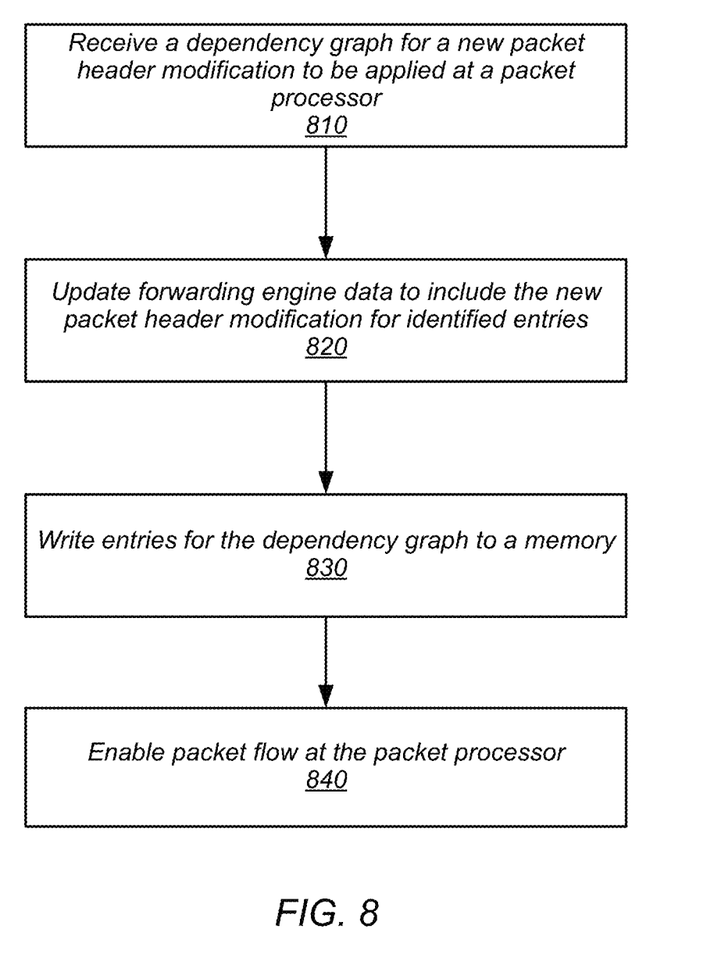
FIG. 8 is a high-level flowchart illustrating various methods and techniques to implement programming packet header modification for network packet processing, according to some embodiments.

As illustrated in FIG. 1, multiple modifications (e.g., modification 120a, modification 120b through modification 120n) may be applied to network packet 112, traversing and applying the operations described in corresponding dependency graphs (e.g., dependency graph 122a, dependency graph 122b through dependency graph 122n). Dependency graphs, like identified modifications, may differ from one modification to the next (as illustrated in FIG. 1). In some embodiments, an interface may be provided to the memory storing dependency graphs 122 via which new dependency graphs for new packet header modifications that may be applied by packet processor 110. FIGS. 3 and 8 discuss such techniques in further detail below.

Please note that previous descriptions are not intended to be limiting, but are merely provided as a logical example of packet header modification for hardware-based packet processing. For example, dependency graphs 122 may be stored in an associative memory device, such as a content addressable memory (CAM).

This specification begins with a general description of a networking device, which may implement packet header modification for hardware-based packet processing. Then various examples of a packet processor and packet modifier are discussed, including different components/modules, or arrangements of components/module that may be implemented and which may perform packet header modification for hardware-based packet processing. A number of different methods and techniques to implement packet header modification for hardware-based packet processing are then discussed, some of which are illustrated in accompanying flowcharts. Various examples are provided throughout the specification.

Figure 2:
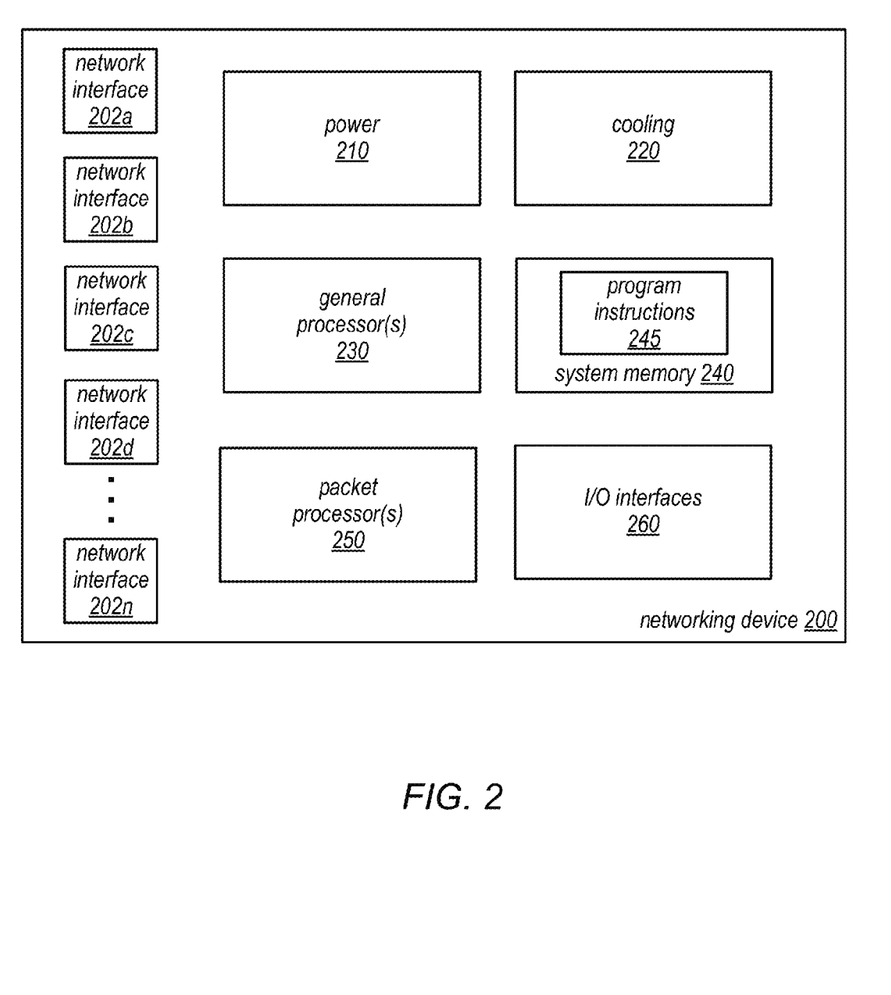
FIG. 2 is a logical block diagram illustrating a networking device that implements packet header modification for packet processing, according to some embodiments.

FIG. 2 is a logical block diagram illustrating a networking device that implements programmable hardware-based tunnel creation for packet processing, according to some embodiments. Networking device 200 may be a networking device configured to connect, route, forward, or otherwise facilitate the communication of different devices, systems or networks via network connections to the networking device (e.g., a switching hub, bridging hub, MAC bridge, or any other networking hardware that performs packet processing for wired or wireless networks). A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking device, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of network switch 200.

Networking device 200 may include general processor(s) 230 which may include multiple cores, and which may be single or multi-threaded) coupled to a system memory 240 via an input/output (I/O) interface 260. Switch 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement tunnel management 300 in FIG. 3 discussed below as well as other management functions and interfaces for network switch 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to provide new tunneling protocol tunnel header data to be applied). In one embodiment, I/O interfaces 260 may be configured to coordinate I/O traffic between processor 230, system memory 245 and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

As noted in FIG. 2, one or more multiple packet processors 250 may be implemented to process data received via network interface(s) 202 at networking device 200. Packet processor(s) 250 may be implemented as dedicated hardware to perform various stages of packet processing for network switch 200. For example, packet processor(s) 250 may be implemented as an application specific integrated circuit (ASIC), field programmable gate array (FPGA), or other dedicated circuitry that performs packet processing. Packet processor(s) 250 may be assigned to one or multiple network interface(s) 202, performing dedicated processing of network data received via the assigned network interface(s) 202. FIG. 3 is a logical block diagram illustrating a packet processor that performs packet header modification, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, such as programmable tunnel header data 380, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different level headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340.

Packet forwarding engines 340 may access data stored in packet tables 350 to make forwarding and tunneling decisions for the network packet based on information in the packet header extracted by packet parser 320. For example, packet forwarding engines 340 may perform lookups for data in level 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port identified in the packet header. If the MAC address is known but attached to a different port than indicated in the MAC address table, then an operation may be performed to move the source MAC address to the port identified in the packet header. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in level 3 (L3) portions of the packet to perform L3 forwarding, in some embodiments. For example, internet protocol (IP) headers for the packet may be evaluated with respect to entries in tables, such as a routing table, to determine forwarding to be performed. Packet forwarding engines 340 may also determine whether tunneling is enabled for the packet. For instance, a tunnel start table may be accessed which indicates whether a tunnel header is to be inserted into the packet. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., content addressable memory or random access memory) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions indicated in the packet metadata determined by packet forwarding engines 340. For example, as discussed below with regard to FIG. 4, packet header modifications identified for a packet in packet metadata generated by packet forwarding engines 340 may be applied at packet modifier 370 based on dependency graphs stored for the identified modifications in programmable packet modification data 380. Packet modifier 370 may also perform other modifications to a packet header, such as inserting a tunnel header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

In at least some embodiments, packet modification interface 300 may be implemented as part of networking device 200 in order to program the packet header modifications that may be applied by packet processor 250. Packet modification interface 300 may be an application and/or interface stored in program instructions 245 and executable at general processor(s) 230 that allows a user to provide dependency graphs and other information to packet processor 250 so that packet processor 250 may perform the packet header modifications for appropriate network packets. For example, packet modification interface 300 may be configured to access on-chip memories implemented as part of packet processor(s) 250 in order to store a new dependency graph for a new packet modification 382 and update packet tables 350 to indicate which network packets should have the new packet header modification 382 applied. In this way, packet processor 250 may apply new packet header modifications in hardware without relying upon software-based packet processing solutions to handle identifying new packet header modifications for network packets and applying the new packet header modifications. FIG. 8, discussed below, provides further detail for programming new packet header modifications which may be performed by packet modification interface 300.

Figure 4:
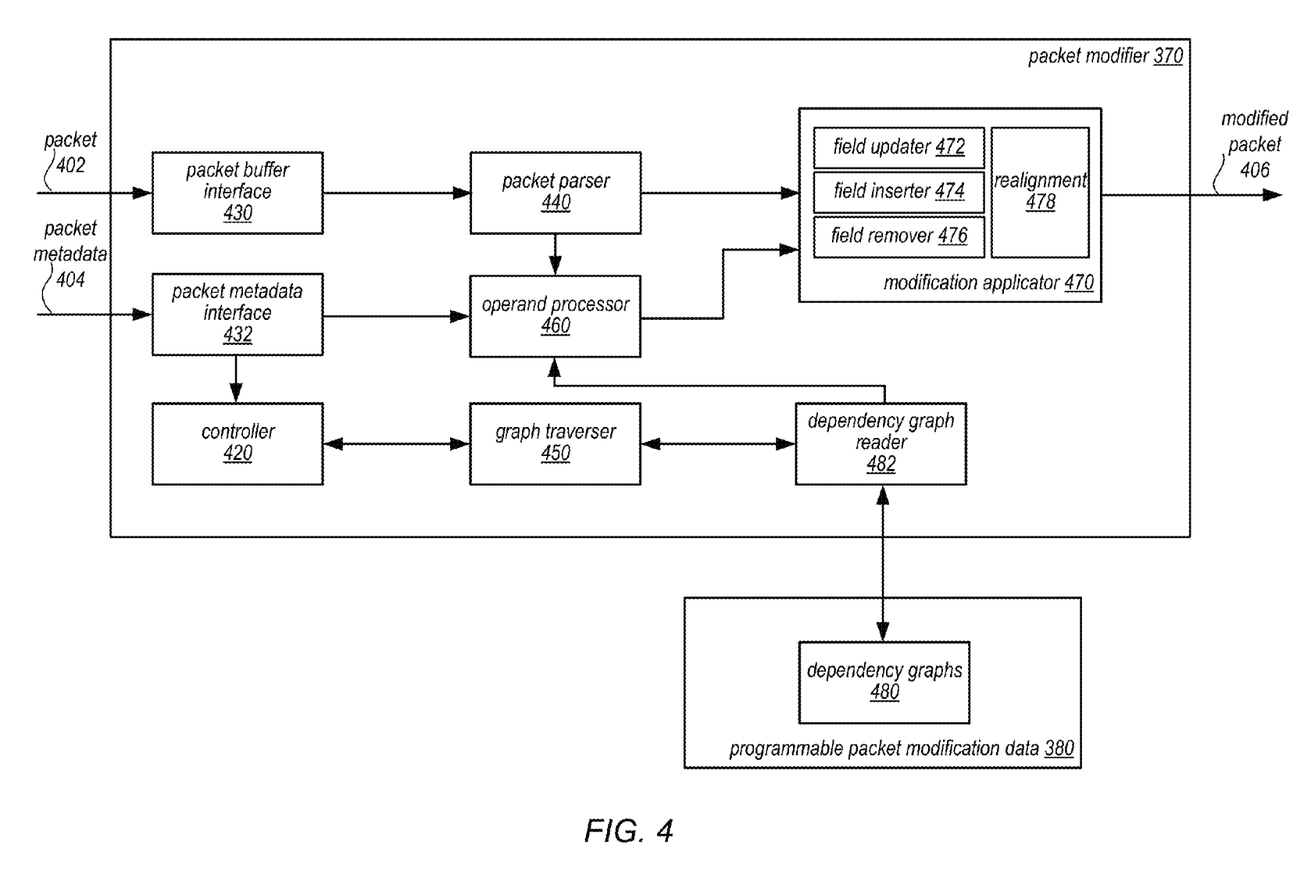
FIG. 4 is a logical block diagram illustrating a network packet modifier, according to some embodiments.

As noted above, packet header modifications may be applied by packet modifier 370 to those network packets indicated in packet metadata. FIG. 4 is a logical block diagram illustrating a network packet modifier, according to some embodiments. Packet modifier 370 may perform packet header modification for network packets. Packet modifier 370 may receive packets 402 and packet metadata 404 and apply one or more packet header modifications (including dependent operations) to a packet header for packet 402. Packet modifier 370 may then output a modified packet 406.

Packet modifier 370 may implement packet buffer interface 430 to receive packets 402 (or packet headers) from packet buffer 330 in FIG. 3 and provide the packet to packet parser 440 for further packet parsing. Likewise, packet metadata interface 432 may receive packet metadata 404 for the packet from scheduler 360 in FIG. 3. Packet metadata 404 received at packet modifier 370 may include locations of packet header modifications indicated for network packet 404 (e.g., an address, index, or pointer to the dependency graph 480 (or entry which identifies the dependency graph 480)) in programmable packet modification data 380. Packet metadata 404 may also include information that may be used to perform packet header modifications, such as payload lengths for different levels (e.g., L2, L2.5, L3, and/or L4) in the packet header, offsets in the packet header for the different levels (e.g., L2, L2.5, L3, and/or L4), and other metadata.

Packet modifier 370 may implement controller 420 to direct the application of packet header modifications. Controller 420 may receive packet metadata from packet metadata interface 432 which indicates which packet header modifications are to be performed. For example, controller 420 may provide location(s) for packet header modifications corresponding to dependency graph(s) 480 stored in programmable packet modification data 380 to graph traverser 450. Graph traverser 450 may direct dependency graph reader 482 to access the location(s) of dependency graph(s) 480. As discussed in detail below with regard to FIGS. 5-7C, entries stored for nodes of a dependency graph may indicate the locations of other entries for other nodes of the dependency graph. For example, an entry may store a location of a child node in the memory or may indicate that an adjacent entry is the next entry for a next node to be accessed and processed. Based on these locations received back from dependency graph reader 482, graph traverser 450 may traverse the entire dependency graph for each identified packet header modification. Graph traverser 450 may provide information obtained from an access of a node of a dependency graph to controller 420 (which may make direct further actions to be performed to apply the packet modification).

In at least some embodiments, packet modifier 370 may implement packet parser 440, operand processor 460 and modification applicator 470 to perform operations to apply packet header modifications and dependent operations to update fields to be changed as a result of packet header modifications. Packet parser 440 may copy a bit field from the packet header or provide a bit field for performing an operation to operand processor 460. For instance, if the change is made to a particular field of the packet header, packet parser 440 may copy the field and provide the field to operand processor 460. Operand processor 460 may receive an identifier or other indication of the operation to be performed as described in the entry for a node of dependency graph 480 that is being processed via dependency graph reader 482. For some operations, an operand may also be provided from the entry. Example operations described by a node of dependency graph 480 may include, but are not limited to, operations to add an operand to the bit field, subtract the operand from the bit field, insert the operand into the bit field, remove the bit field, bitwise "exclusive or" (XOR) the bit field and operand, bitwise "or" (OR) the bit field and operand, bitwise "and" (AND) the bit field and operand, and generate a new checksum for the packet header that is based on one, some or all operations performed for the packet header modification.

The result of the operation performed by operand processor 460 may be provided to modification applicator 470, which may apply the result of the operation to the packet header. Modification applicator 470 may perform different techniques dependent on the operation. For example, modification applicator 470 may implement field updater 472 to update an existing field in the packet header with the result of the operation received from operand processor 460. Modification applicator 470 may also implement field inserter 474 to insert the result of the operation a particular location in the packet header (e.g., according to a location identified by header level, bit field offset, and bit field width in an entry for a node of dependency graph 480). Modification applicator 470 may also implement field remover 476 to remove a field identified by operand processor 460. Modification applicator 470 may also implement realignment 478 to ensure that different level headers within the packet header are correctly aligned after the performance of the packet header modification and dependent operations. Modification applicator 470 may receive (or be configured by) information stored in dependency graph 480 to apply the result of the operation. For example, entries in the dependency graph 480 may store a header level (according to OSI levels, such as L2, L2.5, L3, L3.5, or L4), the offset of the modification within the header, and the width of the header. Controller 420 may, in some embodiments, provide this information to modification applicator 470, or alternatively another component such as operand processor 460 may provide the information.

Note that in various embodiments, programmable packet modification data 380 may be implemented in one or multiple memories. Different types of memory devices may be implemented to store dependency graphs 480. For example, associative memory, such as content addressable memory, or any other semiconductor memory that may be implemented as part of packet processor 250 (e.g., on chip) or accessible to packet processor 250 (e.g., via an interconnect). In at least some embodiments, random access memory components, such as static random access memory (SRAM) or dynamic random access memory (DRAM), may store dependency graphs 480.

Figure 5:
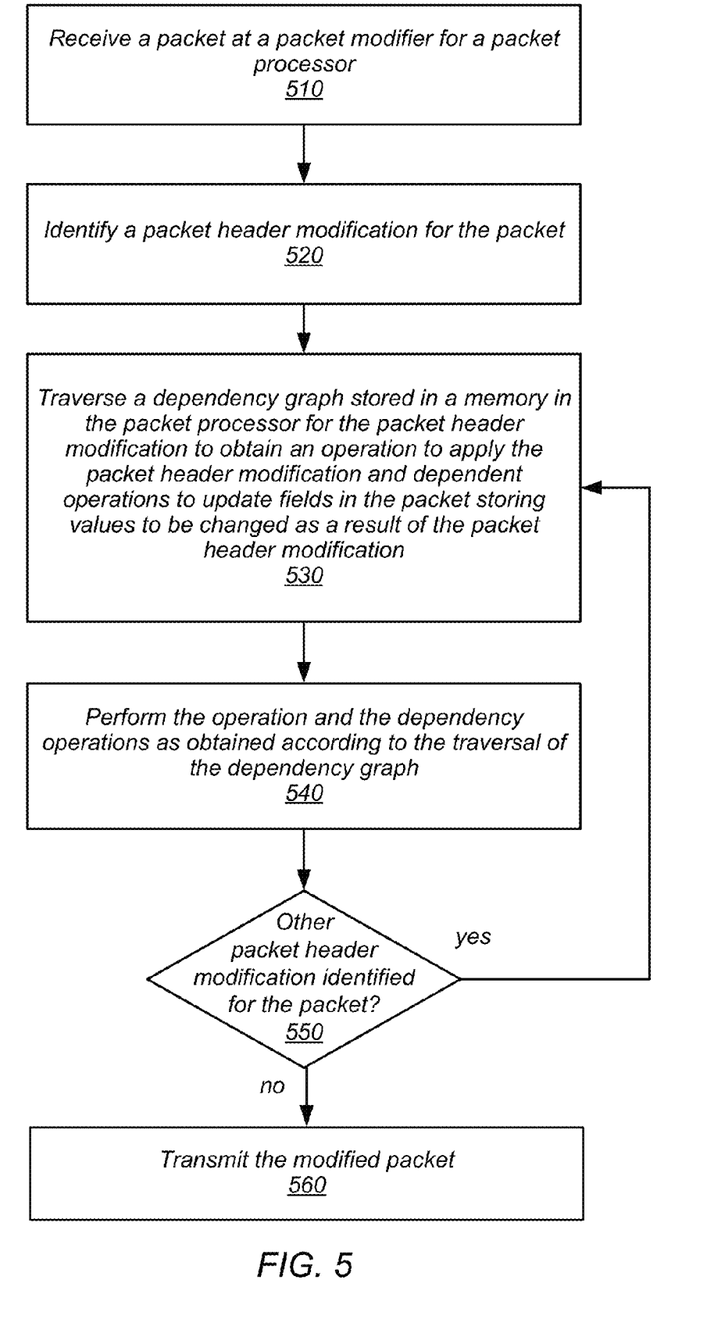
FIG. 5 is a high-level flowchart illustrating various methods and techniques to implement packet header modification for hardware-based packet processing, according to some embodiments.

FIGS. 2-4 provide an example of a networking device that implements a packet processor which may perform packet header modification. However, numerous other types or configurations of hardware-based packet processors or circuitry implementing a packet processing pipeline, such as various types of switches, routers, network bricks, or other networking devices may perform packet header modification. FIG. 5 is a high-level flowchart illustrating various methods and techniques to implement packet header modification for hardware-based packet processing, according to some embodiments. The various components described above may implement these techniques (in addition to those described with regard to FIGS. 6 and 8 below) as well as various other packet processing pipelines and packet processors.

As indicated at 510, a network packet may be received at a packet modifier for a packet processor, in some embodiments. Various ingress packet processing techniques may have been performed prior to the receipt of the packet at the packet modifier which indicate forwarding decisions made with respect to the packet (e.g., L2 and L3 forwarding decisions discussed above with regard to FIG. 3). Packet metadata indicating the forwarding decisions, as well as other information about the packet, including various layer payload lengths and offsets may be included. Packet metadata may also include indications of one or more multiple packet header modifications to be performed. For example, packet metadata may indicate packet header modifications to add or remove of virtual local area network (VLAN) tags, replace destination and source MAC addresses, update Ethernet type, update a time-to-live (TTL) or hop limit, update explicit congestion notification (ECN), update header total length, and/or update checksums. Thus, as indicated at 520, one or more multiple packet header modifications may be identified for the packet.

Figure 6:
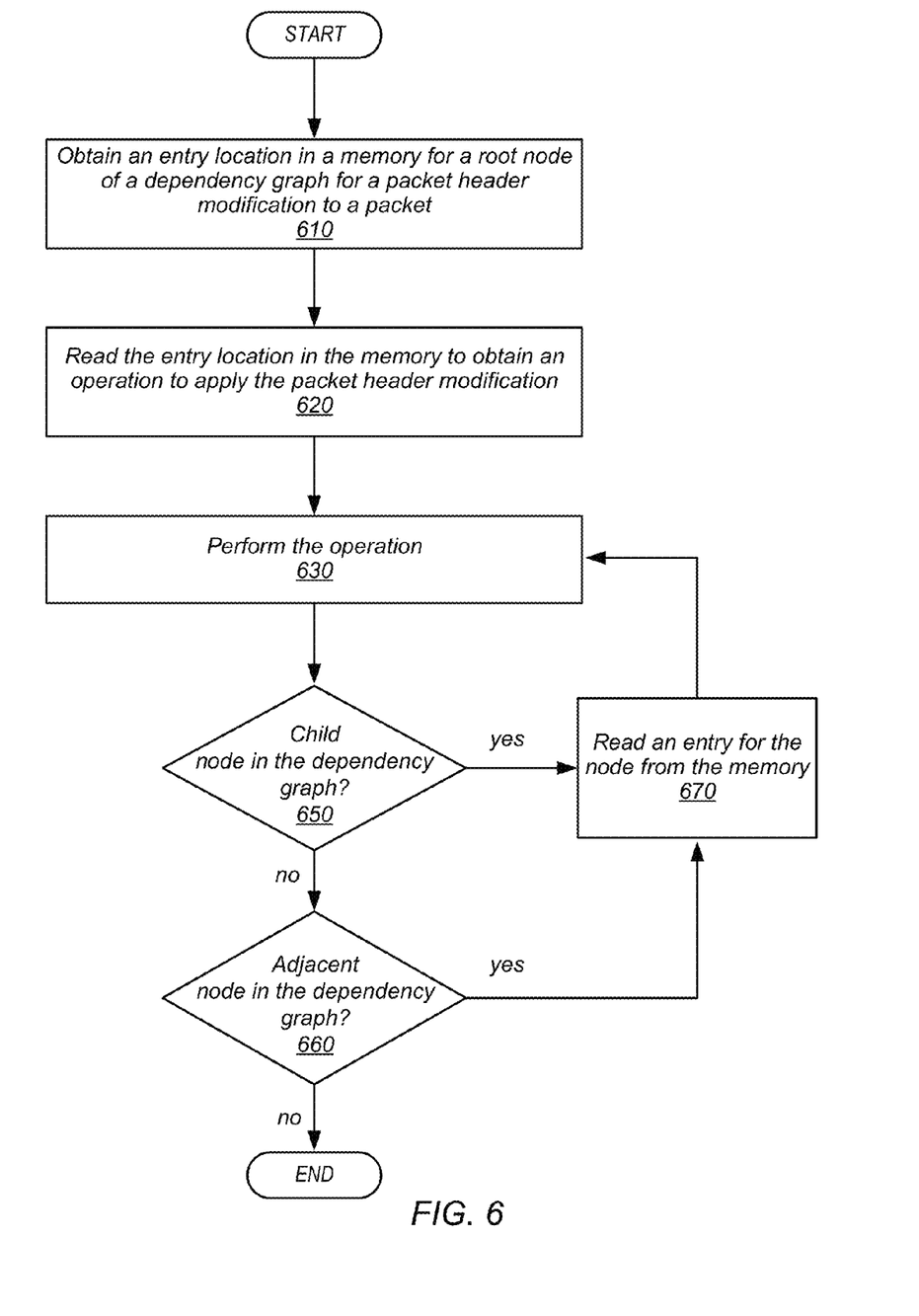
FIG. 6 is a high-level flowchart illustrating various methods and techniques to traverse a dependency graph for a packet header modification, according to some embodiments.

A dependency graph stored in a memory in the packet processor for the identified packet header modification may be traversed to obtain an operation to apply the packet header modification and one or more dependent operations to update fields in the packet storing values to be changed as a result of the packet header modification, as indicated at 530. A dependency graph may include a root node and one or more child nodes describing the operations to apply the packet header modification and the one or more dependent operations. The nodes of the dependency graph may be stored as different entries in the memory. An entry for a node of the dependency graph may include information to perform an operation corresponding to the node and information for traversing the dependency graph. For instance, an entry may include header level information describing the header level at which the operation corresponding to the node is to be performed, the bit field offset from the header level, the width of the bit field to be updated, inserted, or removed according to the operation, the type operation to be performed (addition, subtracting, insertion, deletion, checksum calculation, or bitwise operations, such as XOR, OR, or AND), the operand used for the operation (if applicable), a number of child nodes for the current node (if applicable), and an index to a child node (if applicable). FIG. 6, discussed below, provides example techniques for traversing the dependency graph based on information stored in the entries for nodes of the dependency graph. In a least some embodiments, a depth first search technique may be implemented for traversing the nodes of a dependency graph.

Operations may be performed as obtained according to the traversal of the dependency graph, as indicated at 540, in various embodiments. For example, an operation described in a root node (e.g., the identified packet header modification for the packet) may be performed to update, insert, or remove the identified bit field in the packet header of the network packet. Then, as traversal of the dependency graph identifies individual child nodes in the dependency graph for processing, the information in the corresponding entries for the individual child nodes of the dependency graph may be obtained and the described operation performed. As operations may be performed according to the order in which nodes are traversed in the dependency graph, dependency graphs may be constructed so that operations may be performed in a particular order, in some embodiments. For example, a checksum operation may be located in the dependency graph so that is performed after other operations which affect the checksum value to be generated.

Multiple packet header modifications may be performed for a single network packet. Thus, as indicated by the positive exit from 550, a dependency graph for another packet header modification may be traversed so that operations described for the nodes of the dependency graph may be performed. Once all identified packet header modifications for a network packet are complete, then the modified packet may be transmitted, as indicated at 560.

Dependency graphs may be stored in a memory in different ways, which may result in different techniques for traversing the dependency graph. For instance, the locations of different entries corresponding to different nodes of a dependency graph may be stored so that read operations may be performed in adjacent locations. Different memory devices utilized for storing a dependency graph may also determine the technique. A CAM memory device, for instance, may utilize a lookup function to traverse a dependency graph stored thereon. For a RAM memory device, locations (e.g., indexes, addresses, or other pointers) of nodes in a dependency graph may be stored or determined from information contained in an entry for a parent or sibling node.

FIG. 6 is a high-level flowchart illustrating various methods and techniques to traverse a dependency graph for a packet header modification, according to some embodiments. As indicated at 610, an entry location in a memory for a root node of a dependency graph for a packet header modification may be obtained, in some embodiments. The entry location may be maintained in data accessed for performing forwarding decisions for a network packet (e.g., in a routing table or other table storing data that indicates the packet modification is to be applied to the packet). Forwarding decision-making may generate metadata that includes the entry location in the memory along with other information (e.g., a number of packet header modifications to be performed).

As indicated at 620, data in the entry location may be read from the memory to obtain the operation to apply the packet header modification. As discussed above the data read from the entry may include an indication of the operation to perform, as well as an operand (if applicable) for performing the operation. As indicated at 630, the obtained operation may be performed. Processing of the root node may thus be complete. However, to traverse the dependency graph a next node in the dependency graph may be selected for processing. Selecting the next node may be performed based on the data read from the entry for the root node. For instance, the number dependent or child nodes from the current node (e.g., the root node) may be stored in the entry for the root node. As indicated at 650, if a child node is present in the dependency graph for the current node, then as indicated by the positive exit from 650, the child node may be selected for processing. If multiple child nodes exist, data in the entry for the dependency graph may be used to select a particular child node for processing. For instance, a location of a child node may be included in the entry. Thus, the entry for the child node at the indicated location may be the next node selected for processing. As indicated at 670, an entry for the selected child node may be read from the memory. The operation described in the entry performed, and then a determination may be made again as to whether a child node for the current node (e.g., a child node of the root node) exists in the dependency graph. Child nodes may be selected and described operations in corresponding entries performed until no child node exists for a current node being processed.

Once no further child nodes exist, a determination may be made as to whether an adjacent node exists in the dependency graph for one of the nodes that has already been processed, as indicated at 660. State information or other metadata may be maintained for the graph traversal so that adjacent node determinations may be made. For example, the number child nodes maintained in entries for the different nodes may be maintained. For those nodes that have multiple children, a number of remaining child nodes may be maintained so that the existence of an adjacent node of a current node (or a previously processed node) may be identified (e.g., the number of remaining child nodes may be decremented each time a node is processed, and if greater than zero, at least one adjacent node remains to be processed). If an unprocessed adjacent node remains, then the unprocessed adjacent node may be selected for processing. If more than one unprocessed adjacent node remains, then different techniques may be implemented to select the next adjacent node for processing. In a depth first search selection technique, the selected adjacent node may be identified by back tracking processed nodes in the dependency graph until an adjacent node is located. An entry for the selected adjacent node may be read from memory. An adjacent node entry location may be determined in some embodiments based on the order in which entries for the nodes are stored in the memory. For instance, locations for adjacent nodes may be determined as entries next to a previously processed node that is a child node of a same parent node as the adjacent node. For example, as illustrated in FIG. 7B, the locations for entries corresponding to operation 730 and 740 may be determined by looking for entries adjacent to an entry for operation 720. Selection and processing of nodes may continue until no child or adjacent node remains unprocessed, as indicated by the negative exit from 660.

Figure 7A:
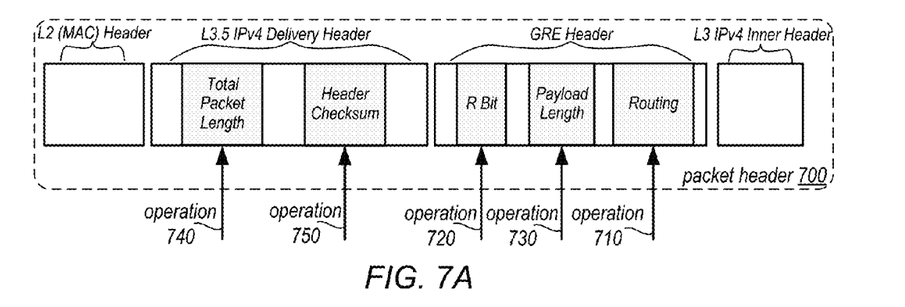
FIGS. 7A-7C illustrate an example network packet header modification, according to some embodiments.
Figure 7B:
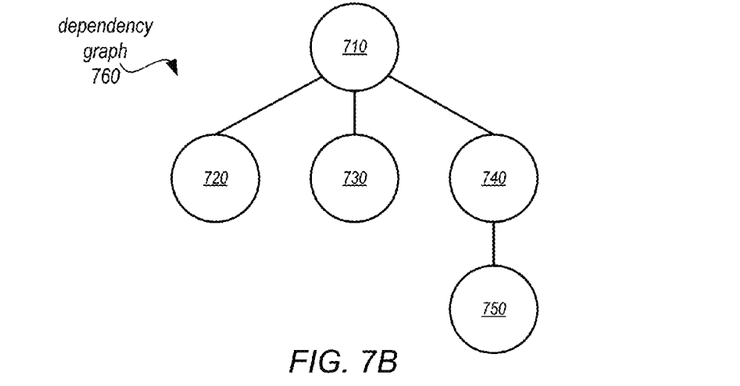
Figure 7C:
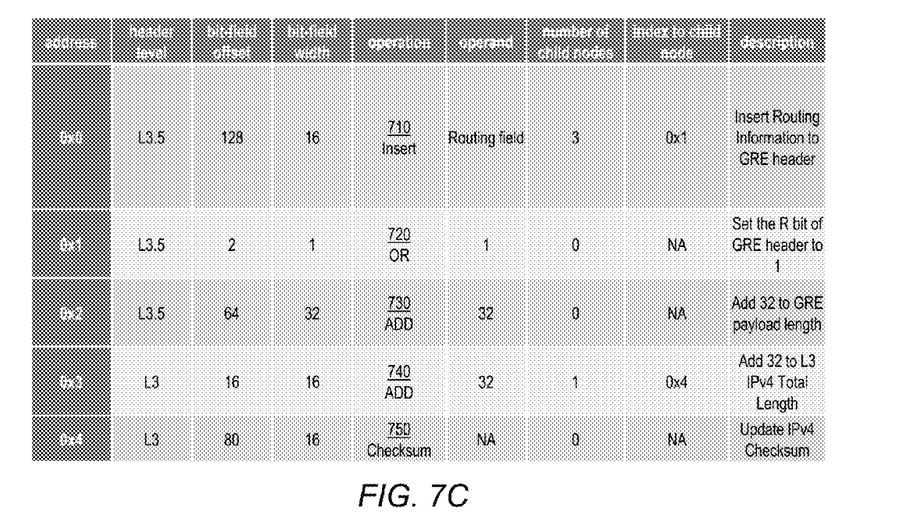

FIGS. 7A-7C provide an example illustration of traversing a dependency graph to perform a packet modification to update routing information for a GRE header in a network packet, according to the techniques discussed above with regard to FIG. 6. In FIG. 7A, packet header 700 may be modified by the packet header modification to update the GRE header by inserting GRE routing information. FIG. 7B graphically illustrates an example dependency graph 760 for the packet header modification to insert the GRE routing information. FIG. 7C illustrates an example layout of entries for the nodes of dependency graph 760 in a memory.

First, the location of the corresponding entry for the root node of dependency graph 760 may be accessed (e.g., at address 0x0). The operation described for the node 710 is an insert operation that applies a given routing field as the operand to insert in the identified location (e.g., header level=L3.5, bit field offset=128, and bit field width=16). Once operation 710 is performed, a determination may be made as to whether node 710 has any dependent nodes. The entry for node 710 indicates that there are 3 child nodes (e.g., nodes 720, 730, and 740). To select the next node for processing, the index to the child node may be used (e.g., 0x1) to locate the entry for the next child node to be processed. The entry for node 720 may be accessed which describes a bitwise OR operation to be performed on a particular bit field located at header level=L3.5, bit field offset=2, and bit field width=1 with respect to an operand value of 1. As described such an operation may set the R bit of the GRE header to a value of 1.

Once the operation for node 720 is performed it may be determined whether a child node for node 720 exists. The number of child nodes for node 720 is set to 0. As no child nodes exist for node 720, then a determination may be made as to whether adjacent nodes exist. Because the entry for node 710 indicate that 3 child nodes exist for node 710, then it may be determined that an adjacent node for child 720 exists (e.g., nodes 720 and 730). As the entries for dependency graph 760 are stored in depth first order, the location of the entry for the next node to process, node 730, may be the next entry in the memory (adjacent to the entry for node 720), address 0x2. The operation described at the entry for node 730 indicates that an ADD operation is to be performed with respect to the bit field located at header level=L3.5, bit field offset=64, and bit field width=32 with respect to add the operand value of 32. In this way 32 may be added to the GRE payload length (which is described by the bit field). Again, no child nodes are indicated so an adjacent node, node 740, is selected for processing. The location for the entry of node 740, address 0x3, may be determined because it is the next entry in the memory after the entry for node 730. The operation described at the entry for node 740 indicates that an ADD operation is to be performed with respect to the bit field located at header level=L3, bit field offset=16, and bit field width=16 with respect to an operand value of 32. In this way 32 may be added to the IPv4 total length (which is described by the bit field).

Because a change was made to the L3.5 IPv4 Delivery Header in packet header 700, a change to header checksum may need to be performed. As indicated in the entry for node 740, 1 child node exists. The location of the child node is provided as address 0x4. The memory may be accessed at address 0x4 to read the entry for node 750. As described in the entry for node 750, a checksum operation may be performed with respect to the checksum field for L3.5 IPv4 Delivery Header, located at header level=L3, bit field offset=80, and bit field width=16. No operand is applicable. Instead, an operation to generate a checksum for L3.5 IPv4 Delivery Header in packet header 700 is generated, including all the changes made as a result of operations encapsulated by L3.5 Delivery Header. Note that the checksum operation may be performed last due to the ordering provided by traversing dependency graph 760, which is desirable in order to capture the changes made by other operations in the new checksum value. This is an example of how operations can be stored in dependency graphs so that a particular ordering for performing operations is followed.

The memory storing dependency graphs for packet header modifications may be programmatically updated to store dependency graphs for new packet modifications that may be applied as part of a packet processing pipeline. FIG. 8 is a high-level flowchart illustrating various methods and techniques to implement programming packet header modification for network packet processing, according to some embodiments. As indicated at 810, a dependency graph may be received for a new packet header modification. The dependency graph may be received via a programmatic interface and/or graphical user interface to the device implementing the packet processing pipeline. For example, a packet modification interface 300 discussed above in FIG. 3, may provide a command line or graphical user interface that allows for dependency graph data to be programmatically provided to the device and stored in the appropriate memory. As indicated at 820, forwarding engine data may also be updated to include the new packet header modification for identified entries. Forwarding engine data may be data utilized by forwarding engines or other forwarding decision makers to forward network packets and identify operations to be applied to network packets as part of forwarding network packets (e.g., data utilized by packet forwarding engines 340 in FIG. 3 above). For example, updates to lookup tables that identify packet header modifications may be downloaded which include entries that identify certain packets for application of the new packet header modification (e.g., based on a determined forwarding destination determined for a network packet). In some embodiments, manual updates may be performed to add the new packet header modification to particular entries in forwarding engine data. The forwarding engine data may include an index or pointer to the dependency graph for the new packet header modification which may be included in metadata generated for a network packet when making forwarding decisions.

As indicated at 830, entries for the dependency graph may be written to a memory storing dependency graphs for packet header modifications. The entries may include information, such as discussed above with regard to FIGS. 5 and 6 (e.g., an entry may include header level information describing the header level at which the operation corresponding to the node is to be performed, the bit field offset from the header level, the width of the bit field to be updated, inserted, or removed according to the operation, the type operation to be performed (addition, subtracting, insertion, deletion, checksum calculation, or bitwise operations, such as XOR, OR, or AND), the operand used for the operation (if applicable), a number of child nodes for the current node (if applicable), and an index to a child node (if applicable)). After the dependency graph has been written to the appropriate memory, packet flow may be enabled at the packet processor, as indicated at 860. Thus when a packet is received that is identified for the new packet header modification, the dependency graph programmatically stored, at element 830 may be utilized to apply the new packet header modification and perform updates to respective fields to be changed as a result of the new packet header modification.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
a plurality of physical network interfaces; and
a packet processor, configured to:
receive a network packet via one of the physical network interfaces;
determine a packet header modification for the network packet;
access different locations in a memory identified for the packet header modification corresponding to a traversal of a dependency graph stored in the memory for the packet header modification, wherein at least one of the different locations is determined from a prior entry of the dependency graph, to obtain:
an operation to apply the packet header modification; and
one or more dependent operations to update respective fields of the network packet that store values to be changed as a result of the packet header modification;
for each access in the memory according to the traversal of the dependency graph, perform the operation to apply the packet header modification or one of the one or more dependent operations; and
upon completion of the traversal of the dependency graph, transmit the modified network packet via one of the physical network interfaces.

2. The networking device of claim 1, wherein the traversal of the dependency graph is performed according to a depth first search technique.

3. The networking device of claim 1, wherein the memory is a static random access memory.

4. The system of claim 1, further comprising:
at least one processor; and
a system memory that stores program instructions that when executed by the at least one processor cause the at least one processor to implement a packet modification interface, wherein the packet modification interface is configured to:
  receive another dependency graph for a new packet header modification to be applied at the packet processor; and
  store the other dependency graph in the memory;
wherein the packet processor is further configured to:
  receive another network packet;
  determine the new packet header modification for the other network packet;
  access different locations in the memory identified for the new packet header modification corresponding to a traversal of the other dependency graph for the new packet header modification to obtain:
    an operation to apply the new packet header modification; and
    one or more dependent operations to update respective fields of the other network packet that store values to be changed as a result of the new packet header modification;
  for each access in the memory according to the traversal of the other dependency graph, perform the operation to apply the new packet header modification or one of the one or more dependent operations to update respective fields of the other network packet that store values to be changed as a result of the new packet header modification; and
  transmit the other network packet via one of the physical network interfaces.

5. A method, comprising:
receiving, at a packet processor, a network packet;
identifying, by the packet processor, at least one packet header modification for the network packet;
traversing, by the packet processor, a dependency graph stored in a memory in the packet processor for the at least one packet header modification, wherein at least one entry of the dependency graph is determined from a prior entry of the dependency graph, wherein the traversing obtains:
  an operation to apply the at least one packet header modification; and
  one or more dependent operations to update respective fields of the network packet, the respective fields storing values to be changed as a result of the at least one packet header modification;
performing, by the packet processor, the operation to apply the at least one packet header modification to the network packet, and performing the one or more dependent operations to update the respective fields of the network packet, wherein the operation and the one or more dependent operations are performed as the operation and the dependent operations are obtained according to the traversing of the dependency graph; and
transmitting, by the packet processor, the modified network packet.

6. The method of claim 5, wherein identifying the at least one packet header modification for the network packet comprises accessing packet metadata for the network packet that indicates the at least one packet header modification and wherein the packet metadata comprises a location of an entry in the memory for a root node of the dependency graph that describes the at least one packet header modification to the network packet.

7. The method of claim 6, wherein one or more other entries are stored in the memory for respective nodes in the dependency graph corresponding to the one or more dependent operations, wherein the entry and the one or more other entries each store a respective number of child nodes of the node corresponding to the entry, and wherein traversing the dependency graph comprises selecting a next node in the dependency graph for traversal based, at least in part, on the respective number of child nodes stored in an entry of a previously processed node in the dependency graph.

8. The method of claim 7, wherein the entry and the one or more other entries further comprise:
  a respective operation identifier; and
  a respective location of a bit field in the network packet in which to perform the operation as identified by the operation identifier.

9. The method of claim 8, wherein at least one of the entry or the one or more other entries further comprises an operand, wherein the operation performed for the at least one entry applies the operand.

10. The method of claim 5, wherein the memory is a random access memory (RAM).

11. The method of claim 5, further comprising:
prior to receiving the network packet:
  receiving the dependency graph for the packet header modification; and
  storing the dependency graph in the memory.

12. The method of claim 5, wherein the packet processor is implemented by an application specific integrated circuit (ASIC).

13. A system, comprising:
a device configured to perform packet processing, the device comprising;
  one or more network interfaces configured to transmit and receive packets via a network connection to the device; and
  a packet processing pipeline, configured to:
    receive a network packet via one of the one or more network interfaces;
    determine a packet header modification for the network packet;
    traverse a dependency graph stored in a memory for the packet header modification, wherein at least one entry of the dependency graph is determined from a prior entry of the dependency graph, wherein the traversal of the dependency graph identifies:
      an operation to apply the packet header modification; and
      one or more dependent operations to update respective fields of the network packet storing values to be changed as a result of the packet header modification;
    perform the operation to apply the packet header modification to the network packet, and perform the one or more dependent operations to update the respective fields of the network packet, wherein the operation and the one or more dependent operations are performed as the operation and the dependent operations are obtained according to the traversal of the dependency graph; and
    transmit the modified network packet via one of the one or more network interfaces.

14. The system of claim 13, wherein a respective entry stored for at least one of the operation or the one or more dependent operations comprises:
  an operand;
  an operation identifier; and a location of a bit field in the network packet in which to apply the operation identified by the operation identifier with respect to the operand.

15. The system of claim 14, wherein an entry is stored in the memory for a root node of the dependency graph that describes the at least one packet header modification to the network packet, wherein one or more other entries are stored in the memory for respective nodes in the dependency graph corresponding to the one or more dependent operations, wherein an ordering of the entry and the one or more other entries in the memory is a depth first ordering, wherein the traversal of the dependency graph is based, at least in part, the ordering of the entry and the one or more other entries.

16. The system of claim 13, wherein the system further comprises a packet modifier interface, configured to:
    receive a new dependency graph for a new packet header modification; and
    store the new dependency graph for the new packet header modification in the memory.

17. The system of claim 16, wherein the packet processing pipeline is further configured to:
    receive another network packet via one of the one or more network interfaces;
    determine the new packet header modification for the network packet;
    traverse the new dependency graph stored in the memory for the new packet header modification, wherein the traversal of the dependency graph identifies:
        an operation to apply the new packet header modification; and
        one or more dependent operations to update respective fields of the other network packet storing values to be changed as a result of the new packet header modification; and
    perform the operation to apply the new packet header modification to the network packet, and perform the one or more dependent operations to update the respective fields of the network packet storing the values to be changed as a result of the new packet header modification, wherein the operation and the one or more dependent operations are performed as the operation and the dependent operations are obtained according to the traversal of the new dependency graph.

18. The system of claim 13, wherein the packet processor is further configured to:
    prior to the transmission of the modified network packet:
        determine another packet header modification for the network packet;
        traverse a different dependency graph stored in the memory for the other packet header modification, wherein the traversal of the different dependency graph identifies:
            an operation to apply the other packet header modification; and
            one or more dependent operations to update respective fields of the network packet storing values to be changed as a result of the other packet header modification; and
        perform the operation to apply the other packet header modification to the network packet, and perform the one or more dependent operations to update the respective fields of the network packet storing the values to be changed as a result of the other packet header modification, wherein the operation and the one or more dependent operations are performed as the operation and the dependent operations are obtained according to the traversal of the different dependency graph.

19. The system of claim 13, wherein the memory is a content addressable memory.

20. The system of claim 13, wherein the system is a network router configured to forward a plurality of network packets including the network packet received via one or more physical network connections to the router.

* * * * *